US011082295B2

(12) United States Patent
Aronov et al.

(10) Patent No.: US 11,082,295 B2
(45) Date of Patent: Aug. 3, 2021

(54) METHODS AND APPARATUS TO IMPLEMENT CLOUD SPECIFIC FUNCTIONALITY IN A CLOUD AGNOSTIC SYSTEM

(71) Applicant: VMware, Inc., Palo Alto, CA (US)

(72) Inventors: Evgeny Aronov, Sofia (BG); Anna Delcheva, Sofia (BG); Ivo Petkov, Sofia (BG); Georgi Mitsov, Sofia (BG); Alexander Dimitrov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/459,214

(22) Filed: Jul. 1, 2019

(65) Prior Publication Data

US 2021/0006467 A1 Jan. 7, 2021

(51) Int. Cl.
*H04L 12/24* (2006.01)
*H04L 29/08* (2006.01)

(52) U.S. Cl.
CPC ...... *H04L 41/0889* (2013.01); *H04L 41/0893* (2013.01); *H04L 67/1097* (2013.01)

(58) Field of Classification Search
CPC ............. H04L 41/0889; H04L 41/0893; H04L 67/1097
USPC .......................................................... 709/220
See application file for complete search history.

(56) References Cited

U.S. PATENT DOCUMENTS

2014/0280961 A1* 9/2014 Martinez ............. H04L 41/5054 709/226
2016/0219097 A1* 7/2016 Gupte ..................... H04L 67/10
2018/0145923 A1* 5/2018 Chen ..................... G06F 9/5077
2018/0145930 A1* 5/2018 Kostov ................ H04L 47/827

OTHER PUBLICATIONS

Bitnami Stacksmith, "Package and Maintain Your Applications on Multiple Clouds," [https://bitnami.com/stacksmith], Mar. 9, 2018, Accessed via [https://web.archive.org/web/20180309211159/https://bitnami.com/stacksmith] on Oct. 1, 2019, 15 pages.

* cited by examiner

*Primary Examiner* — Nicholas R Taylor
*Assistant Examiner* — Chong G Kim
(74) *Attorney, Agent, or Firm* — Hanley, Flight & Zimmerman, LLC.

(57) ABSTRACT

Methods, apparatus, systems and articles of manufacture are disclosed that implement cloud functionality in a cloud agnostic system. An example apparatus to implement cloud specific functionality in a cloud agnostic system includes a request interpreter to determine whether a first request includes an indication that a cloud resource is to be partially provisioned, a provision determiner to select the cloud resource based on the indication, and a cloud interface to transmit a first resource request to partially provision the cloud resource, and in response to a second request including constraints specific to the cloud resource, transmit a second resource request to fully provision the cloud resource.

17 Claims, 9 Drawing Sheets

101 USER DEVICE
103 CLOUD MANAGEMENT PLATFORM
105 CLOUD RESOURCE(S)
FIRST COMMUNICATION 102
SECOND COMMUNICATION 104
THIRD COMMUNICATION 106
FOURTH COMMUNICATION 108
FIFTH COMMUNICATION 110
SIXTH COMMUNICATION 112
SEVENTH COMMUNICATION 114
101 USER DEVICE
103 CLOUD MANAGEMENT PLATFORM
105 CLOUD RESOURCE(S)

METHODS AND APPARATUS TO IMPLEMENT CLOUD SPECIFIC FUNCTIONALITY IN A CLOUD AGNOSTIC SYSTEM

FIELD OF THE DISCLOSURE

This disclosure relates generally to cloud management systems, and, more particularly, to methods and apparatus to implement cloud specific functionality in a cloud agnostic system.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

BRIEF DESCRIPTION OF THE DRAWINGS

The figures are not to scale. In general, the same reference numbers will be used throughout the drawing(s) and accompanying written description to refer to the same or like parts.

Figure 1:
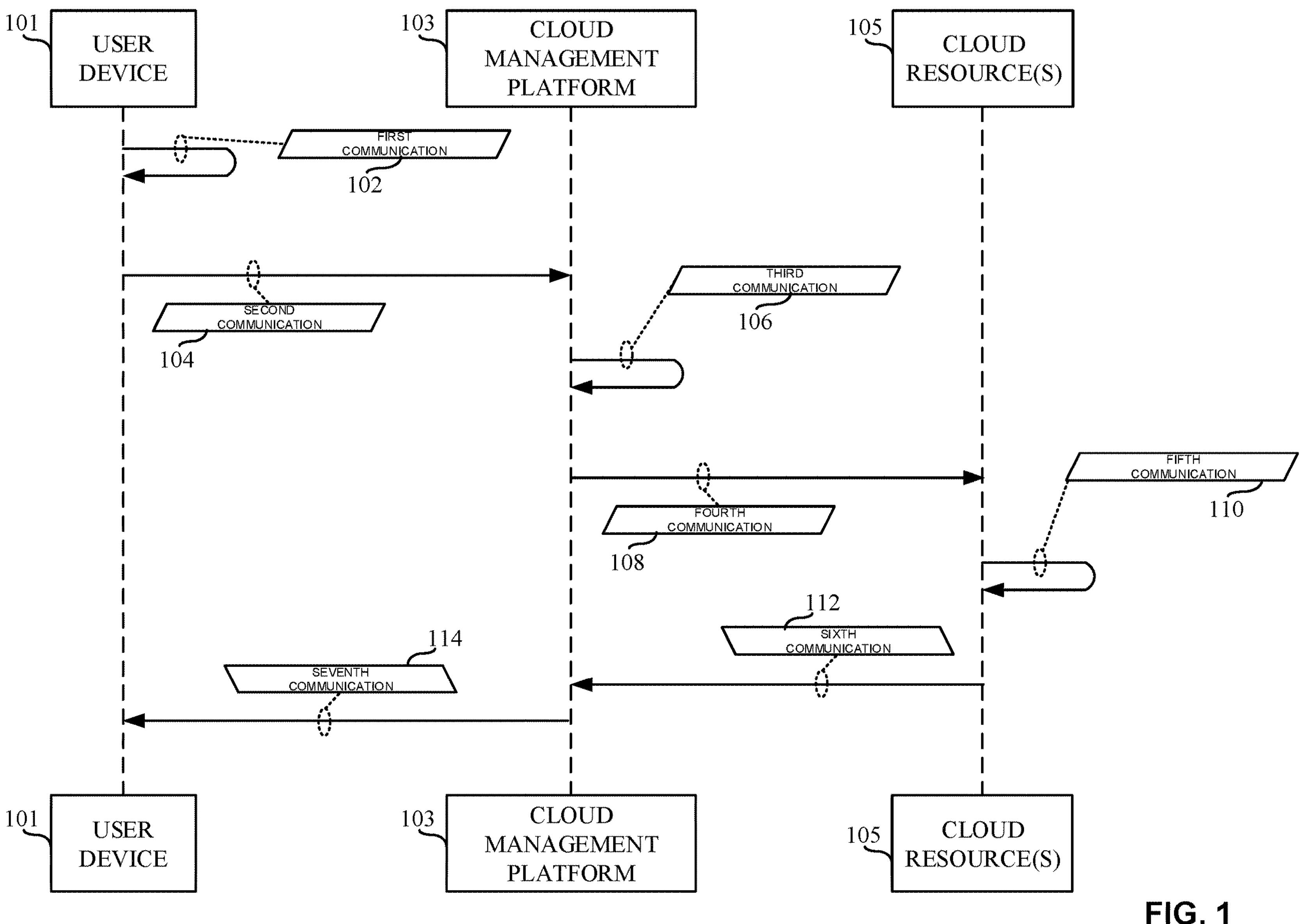
FIG. 1 is a sequence diagram illustrating typical communication among a user device, a cloud management platform, and a cloud resource.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

DETAILED DESCRIPTION

Virtualization technologies can be used for computing, storage, and/or networking, for example. Using virtualization, hardware computing resources and/or other physical resources can be replicated in software. One or more application programming interfaces (APIs) can be implemented to provide access to virtualized resources for users, applications, and/or systems while limiting or masking underlying software and/or hardware structure.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, which is hereby incorporated herein by reference in its entirety.

Certain examples provide multi-cloud management systems and/or platforms that manage a combination of public and private clouds (e.g., a hybrid cloud environment) running a variety of computing processes from traditional processes to virtual machines to container (e.g., cloud native) workloads. An example multi-cloud management platform can provision infrastructure and application resources with a choice of consumption (e.g., application programming interface (API), Catalog, command line interface (CLI), etc.) based on pre-defined policies and permissions. Provisioning and maintenance of resources are automated through creation of blueprints (e.g., models) that include components of requested services along with their relationships, including a mix of VM and container-based services. Integration can be extended to third party and/or customer applications, tools, etc.

In a virtual infrastructure, such as a multi-cloud management platform, an endpoint is a system and/or a service on which a user can provision resources. The endpoint may be a public cloud resource (e.g., a web service such as Amazon Web Services (AWS), etc.), a virtual appliance (e.g., an external orchestrator appliance, etc.), a private cloud (e.g., hosted by VMware vSphere™, Microsoft Hyper-V™, etc.), etc. For example, a service has an endpoint that provides a specific function or feature of that service. The service may have multiple endpoints. For example, a catalog service provides catalog features via an endpoint for a shell/user interface application service to consume. Endpoints can include physical endpoints, virtual endpoints, Internet Protocol Address Management (IPAM) endpoints, etc. An endpoint type defines a set of one or more methods/functions that can be invoked, and an endpoint or endpoint instance is the object that implements or provides access to the methods/functions. An endpoint adapter enables the endpoint and the management system to communicate with each other. The endpoint adapter can facilitate/enable data/instruction communication, security, access control, redundancy, auditing, etc. If properly registered, an infrastructure-driven workflow can be launched for the endpoint via the endpoint adapter, for example.

Cloud computing platforms may provide many powerful capabilities for performing computing operations. Often, provisioned resources are configured during provisioning of infrastructure. Such configuration is often specific to the intended public cloud resource, private cloud resource, IaaS provider, and/or any suitable cloud resource. It is hard to implement such a configuration when using a provisioning platform that is cloud agnostic, as it is not known where the resource will be placed before the actual provisioning happens (e.g., the selected public and/or private cloud is not known). In examples disclosed herein, a cloud agnostic system is a system that manages more than one type of cloud (e.g., AWS, Microsoft Azure, Google Compute Platform (GCP), VMware vSphere) and places the requested workloads and/or provisions the requests based on a set of rules. For example, the set of rules may be based on constraints such as desired cost, desired memory allocation, desired load size, etc.

FIG. 1 is a sequence diagram illustrating typical communication among a user device, a cloud management platform, and a cloud resource. Illustrated in FIG. 1, during the first communication 102, the user device 101 initiates a request to provision a resource on the cloud resource(s) 105. Moreover, during the second communication 104, the user device 101 communicates the request to provision to a resource on the cloud resource(s) 105 to a cloud management platform 103. Typically, the request to provision a resource provided by the user device 101 includes details on the blueprint that specify the desired resource to be provisioned and/or resource configurations (e.g., allocation of memory, cost constraints, number of hard disks, number of central processing units (CPUs), etc.). During a third communication 106, the cloud management platform 103 decides, based on a set of rules and/or the obtained blueprint, the cloud resource(s) 105 to be utilized. In response, the cloud management platform 103 provides a request to the cloud resource(s) 105 in order to provision a resource on the cloud resource(s) 105 during the fourth communication 108. In some implementations, the cloud management platform 103 may execute a series of requests to the cloud resource(s) 105 in order to provision a resource on the cloud resource(s) 105. Having obtained the requests from the cloud management platform 103, the cloud resource(s) 105 then provisions the resource during the fifth communication 110. Once provisioned, the cloud resource(s) 105 communicate(s) with the cloud management platform 103 to indicate the resource has been provisioned during the sixth communication 112. In addition, the cloud management platform 103 communicates with the user device 101 that the resource has been provisioned during the seventh communication 114.

With regards to the sequence illustrated in FIG. 1, if the cloud resource(s) 105 is/are a part of a cloud agnostic system, the user does not know the cloud resource(s) 105 that is/are to be selected. Therefore, the details included on the blueprint that specify the desired cloud computing resource(s) 105 and/or constraints to be provisioned (e.g., during the third communication 106) may be incorrect and/or incompatible with the selected cloud resource. For example, the user may initiate a standard blueprint including an image specific to an Amazon Web Services (AWS) cloud. If the cloud management platform 103 selects a Microsoft Azure cloud and/or a Google Compute Platform (GCP), the resource provisioning will fail.

Examples disclosed herein create an integrated system that allows a user to provision any public and/or private cloud, virtual machine, etc., in a cloud agnostic system. Furthermore, examples disclosed herein allow for custom cloud provisioning on a cloud agnostic system. For example, a user is able to provision a cloud not known prior to the provisioning request.

In examples disclosed herein, when a user provides a provisioning request to a cloud management platform, the user indicates the provisioning request to be a dual-phase provisioning request. For example, the user may indicate the provisioning is for allocation only and, as such, the cloud computing platform allocates the desired resource (e.g., saves a spot) on the selected public and/or private cloud, virtual machine, etc. Examples disclosed herein implement a feature as a part of the provisioning request in the form of a custom property on the provisioning request blueprint. In examples disclosed herein, the custom property may be an allocation flag indicating to allocate only.

Examples disclosed herein allow a user to provide cloud specific data (e.g., constraints, input commands, and/or blueprint images specific to the selected public and/or private cloud, virtual machine, etc.) in response to the allocation of the provision request by the cloud management platform. For example, in a cloud agnostic system, the user may hold off on providing AWS specific image data (e.g., constraints, input commands, and/or blueprint images specific to an AWS cloud) unless the selected public and/or private cloud resource is detected to be an AWS cloud. In examples disclosed herein, the second phase (e.g., when the user provides cloud specific image data) may not include an allocation indication.

In examples disclosed herein, a user may decide to provision a machine (e.g., transmit a provisioning request to a cloud management platform) via a user interface (UI) on the user device. Furthermore, in such examples disclosed herein, a user may provide cloud specific data (e.g., constraints, input commands, and/or blueprint images specific to the selected public and/or private cloud, virtual machine, etc.) by editing parameters of the blueprint (e.g., image parameters) via an application programming interface (API) on the user device.

Figure 2:
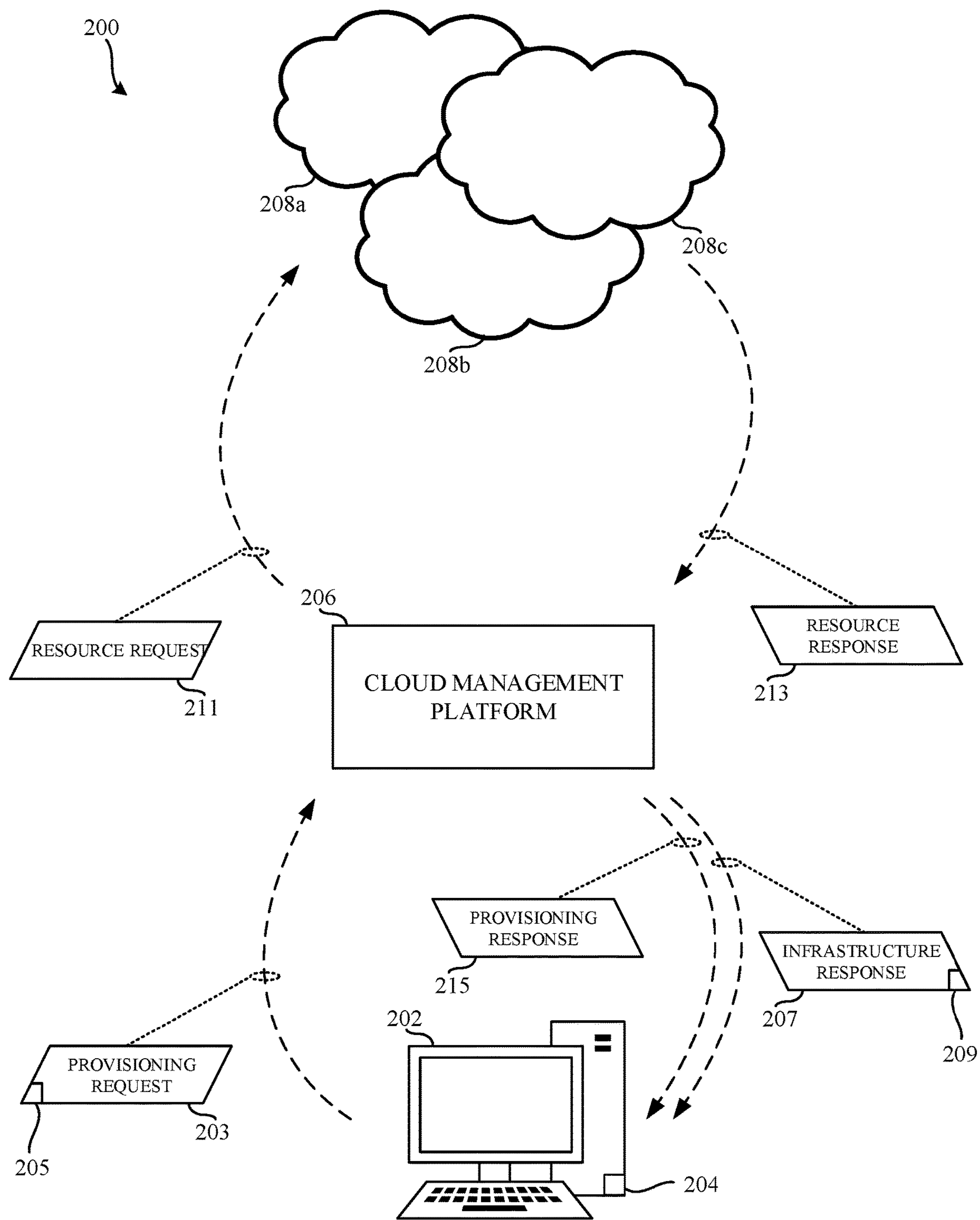
FIG. 2 is an illustration of a network including an example user device, an example cloud management platform, an example cloud resources.

FIG. 2 is an illustration of a network 200 including an example user device 202, an example cloud management platform 206, an example cloud resources 208*a*, 208*b*, 208*c*. In the example of FIG. 2, the user device 202 includes an example allocation generator 204.

In the example of FIG. 2, the user device 202 communicates with the cloud management platform 206 via wireless communication. As such, the user device 202 provides an example provisioning request 203 to the cloud management platform 206 in response to a user initiating the provisioning request 203. In other examples disclosed herein, the user device 202 may provide the provisioning request to the cloud management platform 206 via wired communication, satellite communication, and/or any suitable communication method. In the illustration of FIG. 2, the user device 202 is a personal computer (PC). Additionally or alternatively, the user device 202 may be any device controllable, programmable, and/or structured to transmit the provisioning request 203 to the cloud management platform 206. For example, the user device 202 may be a virtual computer and/or any suitable software, hardware, firmware, and/or any combination of software, hardware, and/or firmware device to transmit the provisioning request 203 to the cloud management platform 206.

In FIG. 2, the provisioning request 203 initiated by the user includes provisioning details for the cloud management platform 206. In examples disclosed herein, the provisioning request may include an example allocation flag 205 operable in response to the allocation generator 204 determining the provisioning request is a preliminary request (e.g., for allocation only). Alternatively, the provisioning request 203 may be transmitted to the cloud management platform 206 without the allocation flag 205. For example, if the user device 202 has access to the selected cloud resource of the cloud resources 208*a*, 208*b*, 208*c* (e.g., an indication is sent by the cloud management platform 206 and thus, the user device 202 determines the selected cloud resource of the cloud resources 208*a*, 208*b*, 208*c*) that is to be provisioned, the provisioning request 203 sent to the cloud management platform 206 may then contain constraints and/or parameters specific to the selected cloud resource (e.g., any of the cloud resources 208*a*, 208*b*, 208*c*) and thus, no allocation flag 205 is included. In such examples disclosed herein, the allocation flag 205 may or may not be included in response to a determination and/or placement by the allocation generator 204. In another example, the provisioning request 203 may not include an allocation flag 205 and, thus, the cloud management platform 206 may, in view of communication with the cloud resources 208*a*, 208*b*, 208*c* may determine that the provisioning request 203 is for allocation only. Such examples disclosed herein are explained in further detail below, in connection with the cloud management platform 206 and FIG. 4.

In the example illustrated in FIG. 2, the allocation generator 204 communicates with the user device 202 to determine whether the allocation flag 205 is to be included in the provisioning request 203. For example, the user may indicate when initiating the provisioning request 203 that the provisioning request 203 is for allocation only. Such an indication may be provided via an image on a blueprint file of the provisioning request 203. As such, the allocation generator 204 interprets the image on the blueprint file of the provisioning request 203 and determines whether to set the allocation flag 205.

In addition, the user device 202 and/or the allocation generator 204 observe an example infrastructure response 207 from the cloud management platform 206. In response to the first phase of provisioning (e.g., in response to the provisioning request 203 including the allocation flag 205), the infrastructure response 207 from the cloud management platform 206 indicates the selected one(s) of the cloud resources 208*a*, 208*b*, 208*c*. As such, the infrastructure response 207 contains an example indicator 209 including custom constraints of the selected one(s) of the cloud resources 208*a*, 208*b*, 208*c*. Alternatively, the infrastructure response 207 may contain the indicator 209 in which the indicator 209 includes a failure warning and/or any response indication the unsuccessful cloud resource selection.

Additionally, the user device 202 communicates with the cloud management platform 206 to obtain an example provisioning response 215. The provisioning response 215 from the cloud management platform 206 indicates whether the full provisioning of one of the cloud resources 208*a*, 208*b*, 208*c* is successful. As such, if the full provisioning is successful, the provisioning response 215 indicates information relating to the full provisioning and continued use of the provisioned cloud resource (e.g., one(s) of the cloud resources 208*a*, 208*b*, 208*c*). Alternatively, if the full provisioning is unsuccessful, the provisioning response 215 indicates a failure warning and/or any response indication the unsuccessful full provisioning.

In FIG. 2, the cloud management platform 206 communicates with the user device 202 and the cloud resources 208*a*, 208*b*, 208*c*. In the example of FIG. 2, the cloud management platform 206 determines whether the provisioning request 203 includes the allocation flag 205. Additionally, the cloud management platform 206 determines the selected cloud resource(s) of the cloud resources 208*a*, 208*b*, 208*c* that is to be utilized based on the content of the provisioning request 203 (e.g., the desired memory, cost constraints, etc.) and a set of specified rules (e.g., operating time, available load capacity, etc.). In some examples disclosed herein, the cloud management platform 206 may determine the selected cloud resource from the cloud resources 208*a*, 208*b*, 208*c* at any point in time with respect to obtaining the provisioning request 203 (e.g., before interpreting the allocation flag 205, before obtaining the provisioning request 203, etc.). The cloud management platform 206 analyzes the provisioning request 203 to determine whether the allocation flag 205 is present. Additionally or alternatively, the cloud management platform 206 may independently set an allocation flag (e.g., perform a similar task as the allocation generator 204). For example, in cloud agnostic systems, the cloud management platform 206 may include a respective allocation generator to indicate partial provisioning (e.g., allocation only) of the provisioning request 203.

The cloud management platform 206 may transmit and/or otherwise send the resource request 211 to the cloud resources 208*a*, 208*b*, 208*c*. For example, the cloud management platform 206 transmits the resource request 211 to a single one (e.g., the selected cloud resource) of the cloud resources 208*a*, 208*b*, 208*c* in response to obtaining a provisioning request (e.g., the provisioning request 203) including cloud specific data.

In some examples disclosed herein, the resource request 211 is a request to partially provision the selected one(s) of the cloud resources 208*a*, 208*b*, 208*c*. For example, if the provisioning request 203 from the user device 202 includes the allocation flag 205, then the cloud management platform 206 transmits and/or otherwise sends the resource request 211 as a partial provision request (e.g., reserve resource space in the selected cloud resource). In yet another example, the cloud management platform 206 may determine to flag the provisioning request 203 based on the cloud resources 208*a*, 208*b*, 208*c* being in a cloud agnostic system.

Alternatively, the resource request 211 may be a request to fully provision the selected one(s) of the cloud resources 208*a*, 208*b*, 208*c*. For example, if the provisioning request 203 from the user device 202 does not include the allocation flag 205, then the cloud management platform 206 transmits and/or otherwise sends the resource request 211 as a full provision request.

In addition, the cloud management platform 206 communicates with the cloud resources 208*a*, 208*b*, 208*c* to obtain a resource response 213. The resource response is explained in further detail below, in connection with the cloud resources 208*a*, 208*b*, 208*c*.

In the example illustrated in FIG. 2, the cloud resources 208*a*, 208*b*, 208*c* may be any of a public cloud resource (e.g., a web service such as Amazon Web Services (AWS), etc.), a virtual appliance (e.g., an external orchestrator appliance, etc.), a private cloud (e.g., hosted by VMware vSphere™, Microsoft Hyper-V™, etc.), etc. In FIG. 2, one or more of the cloud resources 208*a*, 208*b*, 208*c* communicate with the cloud management platform 206 to execute the resource request 211. If the resource request 211 includes an allocation flag (e.g., the allocation flag 205), then the one or more cloud resources 208*a*, 208*b*, 208*c* communicate to the cloud management platform 206 the resource response 213 having been partially provisioned. Alternatively, if the resource request 211 does not include an allocation flag (e.g., the allocation flag 205), then the one or more cloud resources 208*a*, 208*b*, 208*c* communicate to the cloud management platform 206 the resource response 213 having been fully provisioned.

Figure 3:
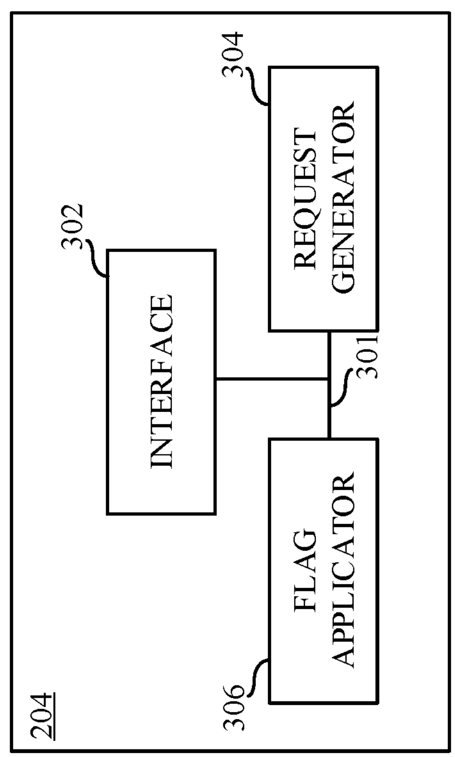
FIG. 3 is a block diagram illustrating the example allocation generator of FIG. 2.

FIG. 3 is a block diagram illustrating the example allocation generator 204 of FIG. 2. The allocation generator 204 includes an example interface 302, an example request generator 304, and an example flag applicator 306. In FIG. 3, the interface 302, the request generator 304, and the flag applicator 306, communicate via an example communication bus 301.

In the example of FIG. 3, the interface 302 interacts with, communicates with, and/or otherwise obtains an initial request from the user device 202. In such examples, the user device 202 of FIG. 2 can interact with the allocation generator 204 via the interface 302 to register and/or access the provisioning request 203. For example, the user device 202 may interact with the interface 302 to provoke instantiation of the provisioning request 203 and/or indicate the allocation preference of the provisioning request 203 (e.g., to be fully provisioned or partially provisioned). Moreover, the interface 302 communicates with the request generator 304 and/or the flag applicator 306 via the communication bus to transmit and/or otherwise send the initial request from the user device 202. Additionally, the interface 302 may obtain cloud resource specific data and/or constraints from the request generator 304 and/or the flag applicator 306 to update the provisioning request 203 in response to cloud management platform 206 identifying the selected one(s) of the cloud resources 208*a*, 208*b*, 208*c* (e.g., in response to the infrastructure response 207).

In FIG. 3, the request generator 304 generates the provisioning request 203 for the cloud management platform 206. Additionally, the request generator 304 communicates with the flag applicator 306, via the communication bus 301, to determine whether to apply the allocation flag 205 to the provisioning request 203. In such an example, if the flag applicator 306 indicates to partially provision (e.g., to apply the allocation flag 205 to the provisioning request 203), then the request generator may insert the allocation flag 205 into the provisioning request 203. In examples disclosed herein, the allocation flag 205 may be inserted into the provisioning request 203 via an additional image on the blueprint file associated with the provisioning request 203. Additionally or alternatively, the request generator 304 may provide updated request constraints (e.g., cloud resource specific constraints and/or images) in response to the cloud management platform 206 identifying the selected cloud resource(s) from the cloud resources 208*a*, 208*b*, 208*c*. For example, the user device 202 may indicate additional cloud specific constraints (e.g., constraints specific to an AWS cloud if an AWS cloud is selected by the cloud management platform 206) in response to the infrastructure response 207.

In the example illustrated in FIG. 3, the flag applicator 306 communicates with the user device 202 to determine whether the allocation flag 205 is to be included on the provisioning request 203. For example, if the user device 202 indicates to allocate only (e.g., indicates to allocate only via a specific image on the provisioning request 203 blueprint), then the flag applicator 306 communicates with the request generator 304 to include the allocation flag 205. Additionally, the flag applicator 306 communicates with the cloud management platform 206 and, more specifically, the infrastructure response 207 to determine whether to remove the allocation flag 205 in a subsequent provisioning request (e.g., a second phase of the provisioning request 203). In another example, the user device 202 may indicate to the flag applicator 306 to remove the allocation flag 205 via removing the image from the blueprint file.

Figure 4:
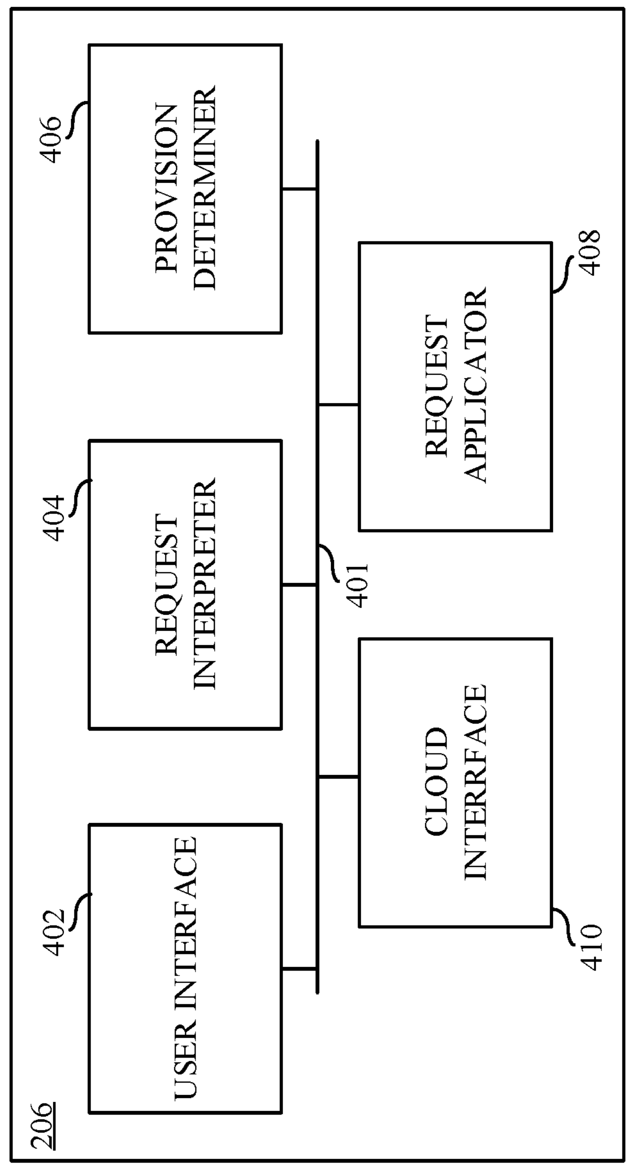
FIG. 4 is a block diagram illustrating the example cloud management platform of FIG. 2.

FIG. 4 is a block diagram illustrating the example cloud management platform 206 of FIG. 2. The cloud management platform 206 includes an example user interface 402, an example request interpreter 404, an example provision determiner 406, an example request applicator 408, and an example cloud interface 410. In FIG. 4, the user interface 402, the request interpreter 404, the provision determiner 406, the request applicator 408, and/or the cloud interface 410 may communicate via an example cloud management communication bus 401.

In the example of FIG. 4, the user interface 402 interacts with, communicates with, and/or otherwise obtains the provisioning request 203 from the user device 202. The user interface 402 determines whether the provisioning request 203 includes the allocation flag 205. In response to the determination, the user interface 402 communicates with any of the request interpreter 404, the provision determiner 406, the request applicator 408, and/or the cloud interface 410. In another example disclosed herein, the user interface 402 provides the infrastructure response 207 to the user device.

In FIG. 4, the request interpreter 404 obtains the provisioning request 203 from the user interface. In examples disclosed herein, the request interpreter 404 interprets the provisioning request 203 to extract the provisioning details and content of the provisioning request 203. For example, the request interpreter 404 determines, based on the content of the provisioning request 203, the specified memory allocation size, the desired cost, whether the allocation flag 205 is present, and/or any suitable constraint and/or image in the provisioning request 203 blueprint file.

In one example, the request interpreter 404 can determine that and allocation flag 205 should have been applied by analyzing the constraints and/or images in the provisioning request 203 blueprint file. For example, if the provisioning request 203 does not include an allocation flag 205, and the provisioning request is incomplete (e.g., critical components are missing), then the request interpreter 404 can determine that an allocation flag (e.g., the allocation flag 205) is to be applied. In examples disclosed herein, the request interpreter 404 communicates the provisioning request 203 details to any of the user interface 402, the provision determiner 406, the request applicator 408, and/or the cloud interface 410.

In FIG. 4, the provision determiner 406 communicates with any of the user interface 402, the request interpreter 404, the request applicator 408, and/or the cloud interface 410 to determine the selected one(s) of the cloud resources 208*a*, 208*b*, 208*c*. For example, the provision determiner 406 utilizes the available constraints from the provisioning request 203 (e.g., the desired cost, total memory allocation, etc.) to select the selected one(s) of the cloud resources 208*a*, 208*b*, 208*c*. In another example, the provision determiner 406 communicates with the cloud interface 410 to determine, of the cloud resources 208*a*, 208*b*, 208*c*, the cloud resource best suited for the provisioning request 203. If the provisioning request 203 prompts for 2 gigabytes of memory allocation, then the provision determiner 406 may utilize any of the cloud resources 208*a*, 208*b*, 208*c* that can provide 2 gigabytes of memory allocation. In another example, the provision determiner 406 may utilize any plurality of rules and/or constraints in conjunction to select the best cloud resource of the cloud resources 208*a*, 208*b*, 208*c*. For example, if two of the cloud resources 208*a*, 208*b*, 208*c* (e.g., the cloud resources 208*a* and 208*b*) can satisfy the total cost constraint (e.g., are priced within the users cost limit) and one of cloud resources 208*a*, 208*b*, 208*c* (e.g., the cloud resource 208*b*) can satisfy the desired memory allocation constraint (e.g., the cloud resource 208*b* has unused memory to allocate for the resource request 211), then the provision determiner 406 selects the cloud resource 208*b* as the selected one of the cloud resources 208*a*, 208*b*, 208*c*. In such an example, the selected resource (e.g., the cloud resource 208*b*) is partially provisioned and the indication of the selected resource (e.g., the cloud resource 208*b*) and/or any unsatisfied constraints specific to the selected resource (e.g., the cloud resource 208*b*) are included in the resource response 213.

In the example illustrated in FIG. 4, the request applicator 408 communicates with the user interface 402 to generate and/or otherwise cause the user interface 402 to transmit the infrastructure response 207 to the user device 202. In such an example, the infrastructure response 207 includes the selected cloud resource(s) of the cloud resources 208*a*, 208*b*, 208*c* and the requested constraints.

Furthermore, the request applicator 408 communicates with the request interpreter 404 to generate and/or otherwise transmit the resource request 211 to the user interface 402, the request interpreter 404, the provision determiner 406, and/or the cloud interface 410. In examples disclosed herein, the resource request 211 may be a request to partially provision the selected cloud resources 208*a*, 208*b*, 208*c*. Alternatively, in some examples disclosed herein, the request applicator 408 generates the resource request 211 in response to the user device 202 transmitting the provisioning request 203 including the selected cloud resource data. In examples disclosed herein, the resource request 211 may indicate whether to partially or fully provision the selected one(s) of the cloud resource(s) 208*a*, 208*b*, 208*c*.

The request applicator 408 may generate the resource request 211 after the provision determiner 406 determines the available cloud resource(s) of the cloud resources 208*a*, 208*b*, 208*c* and after the infrastructure response 207 is sent. In such an example, the resource request 211 may indicate to partially provision the selected cloud resource of the cloud resources 208*a*, 208*b*, 208*c*.

Alternatively, the request applicator 408 may determine that the provisioning request 203 includes a satisfactory blueprint based on content of the provisioning request 203, and in response to the provisioning request 203 including a satisfactory blueprint and the provisioning request 203 not indicating to partially provision, generate the resource request 211 indicating to fully provision the selected cloud resource of the cloud resources 208*a*, 208*b*, 208*c* (e.g., because the provisioning request 203 includes a satisfactory blueprint including content to fully provision and there is no allocation flag 205 present in the provisioning request). In other examples disclosed herein, the request applicator 408 may determine that the provisioning request 203 does not include a satisfactory blueprint based on content of the provisioning request 203, and generate the resource request 211 indicating to partially provision the selected cloud resource of the cloud resources 208*a*, 208*b*, 208*c* (e.g., because the provisioning request 203 does not include a satisfactory blueprint). In any example disclosed herein, a request to partially provision a selected one(s) of the cloud resource(s) 208*a*, 208*b*, 208*c* may be utilized to both determine the selected one(s) of the cloud resource(s) 208*a*, 208*b*, 208*c* and/or reserve memory, processing resources, etc., on the selected one(s) of the cloud resource(s) 208*a*, 208*b*, 208*c* for use at a later time. Such a later time may be determined when the provisioning request 203 includes a satisfactory blueprint and/or no allocation flag 205. As such, the selected one(s) of the cloud resource(s) 208*a*, 208*b*, 208*c* are to be fully provisioned.

In FIG. 4, the cloud interface 410 provides a communication abstraction layer by which the cloud management platform 206 may communicate with the cloud resources 208*a*, 208*b*, 208*c*. As such, the cloud interface 410 can communicate the resource request 211 to the selected one(s) of the cloud resources 208*a*, 208*b*, 208*c*. In examples disclosed herein, the cloud interface 410 operates in response to the provision determiner 406 determining the selected one(s) of the cloud resources 208*a*, 208*b*, 208*c* and the user device 202 identifying the cloud specific data (e.g., identifying the cloud specific data in view of the infrastructure response 207). Additionally, the cloud interface 410 communicates with the cloud resources 208*a*, 208*b*, 208*c* to obtain the resource response 213 from the selected one(s) of the cloud resources 208*a*, 208*b*, 208*c*. As such, the cloud interface 410 communicates with any of the user interface 402, the request interpreter 404, the provision determiner 406, and/or the request applicator 408 to provide and/or obtain the resource request 211 and/or the resource response 213 to and/or from the selected one(s) of the cloud resources 208*a*, 208*b*, 208*c*.

Figure 5:
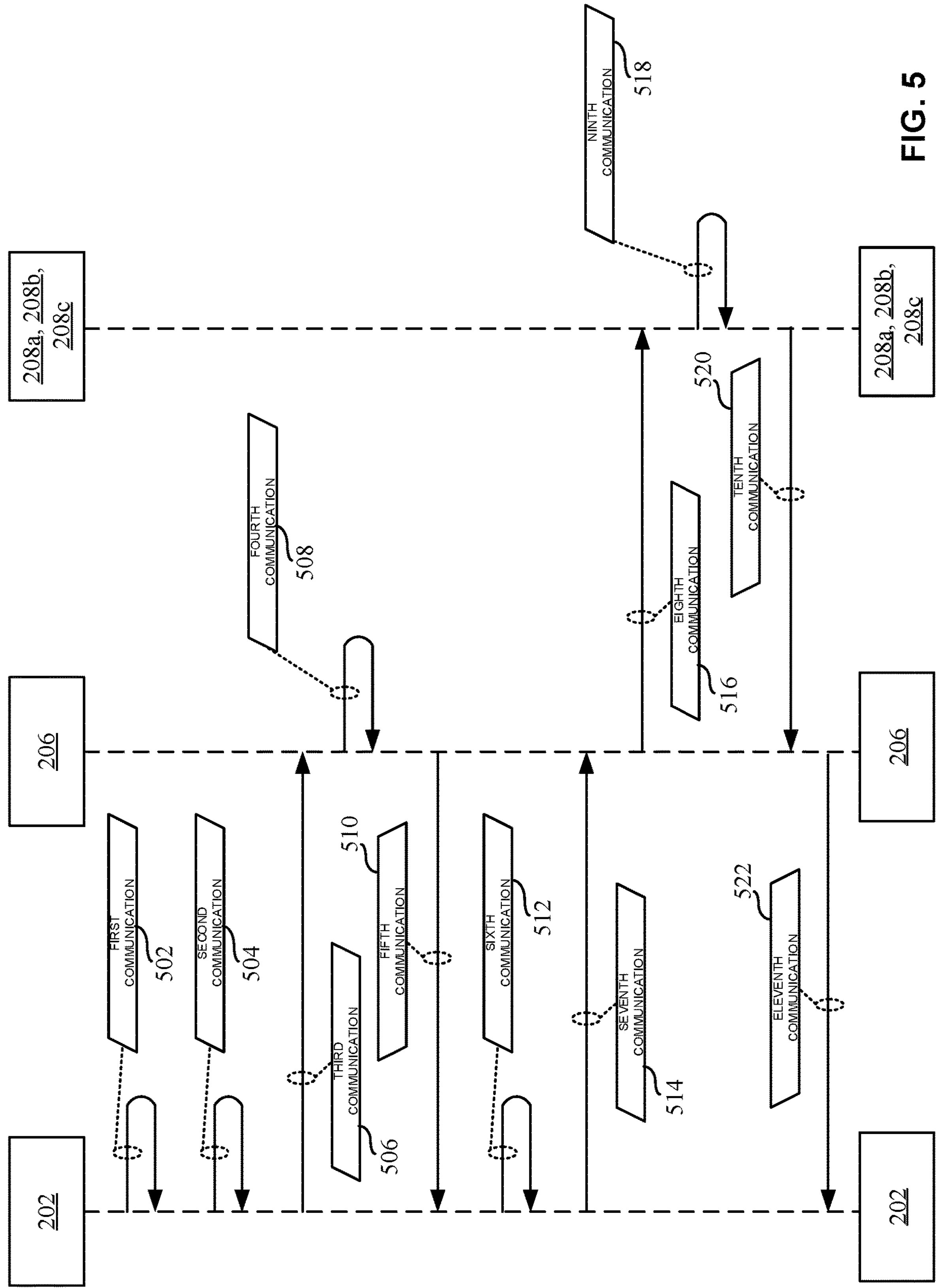
FIG. 5 is an example sequence diagram illustrating communication among the user device, the cloud management platform, and the cloud resources of FIG. 2 in a cloud agnostic system.

FIG. 5 is an example sequence diagram illustrating communication among the user device 202, the cloud management platform 206, and the cloud resources 208*a*, 208*b*, 208*c* of FIG. 2 in a cloud agnostic system.

Illustrated in FIG. 5, during an example first communication 502, the user device 202 prepares and creates a provisioning request (e.g., the provisioning request 203 of FIG. 2). In addition, the user device 202 or, more specifically, the allocation generator 204 generates and/or otherwise provides an allocation flag to the provisioning request (e.g., provides the allocation flag 205 to the provisioning request 203) during an example second communication 504. In response to the second communication 504, the user device 202 transmits and/or otherwise provides the provisioning request (e.g., the provisioning request 203) to the cloud management platform 206 during an example third communication 506.

During an example fourth communication 508, the cloud management platform performs placement logic (e.g., determines the selected cloud resource of the cloud resources 208*a*, 208*b*, 208*c*). Once the selected cloud resource is determined, the cloud management platform 206 transmits an infrastructure response (e.g., the infrastructure response 207) to the user device 202 during an example fifth communication 510. Additionally, in examples disclosed herein, the cloud management platform 206 may transmit a partial provisioning request (e.g., the resource request 211) to the selected one(s) of the cloud resources 208*a*, 208*b*, 208*c* after the fourth communication 508 and before the fifth communication 510. Such an additional example communication reserves and/or otherwise allocates the provisioning space in the selected one(s) of the cloud resources 208*a*, 208*b*, 208*c* while the user device 202 interacts with the fifth communication 510.

In response, the user device 202 provides and/or otherwise generates a provisioning request (e.g., the provisioning request 203) without an allocation flag (e.g., the allocation flag 205) and with the cloud specific constraints during an example sixth communication 512. During an example seventh communication 514, the user device 202 communicates the updated provisioning request (e.g., the provisioning request 203 without the allocation flag 205 and with the cloud specific constraints) to the cloud management platform 206. Additionally or alternatively, in some examples disclosed herein, the cloud management platform 206 may generate an identifier to be included in the fifth communication 510. Further in such examples disclosed herein, the user device 202 may include the identifier in the seventh communication 514 to distinguish the updated provisioning request sent in the seventh communication 514 (e.g., the provisioning request 203 without the allocation flag 205 and with the cloud specific constraints) from the provisioning request sent in the third communication 506 (e.g., the provisioning request 203 with the allocation flag 205).

The cloud management platform 206, after creating the resource request (e.g., the resource request 211), transmits the corresponding resource request (e.g., the resource request 211) to the selected one(s) of the cloud resources 208*a*, 208*b*, 208*c* during an example eighth communication 516.

In response, the selected one(s) of the cloud resources 208*a*, 208*b*, 208*c* fully provision based on the resource request (e.g., the resource request 211) during an example ninth communication 518. Once provisioned, the selected one(s) of the cloud resources 208*a*, 208*b*, 208*c* communicate with the cloud management platform 206 to indicate the resource has been provisioned during an example tenth communication 520 (e.g., the resource response 213). In addition, the cloud management platform 206 communicates with the user device 202 that the resource has been provisioned during an example eleventh communication 522 (e.g., the provisioning response 215).

While an example manner of implementing the allocation generator 204 of FIG. 2 is illustrated in FIG. 3, one or more of the elements, processes and/or devices illustrated in FIG. 3 may be combined, divided, re-arranged, omitted, eliminated and/or implemented in any other way. Further, the example interface 302, the example request generator 304, the example flag applicator 306 and/or, more generally, the example allocation generator 204 of FIG. 2 may be implemented by hardware, software, firmware and/or any combination of hardware, software and/or firmware. Thus, for example, any of the example interface 302, the example request generator 304, the example flag applicator 306 and/or, more generally, the example allocation generator 204 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 302, the example request generator 304, and/or the example flag applicator 306 is/are hereby expressly defined to include a non-transitory computer readable storage device or storage disk such as a memory, a digital versatile disk (DVD), a compact disk (CD), a Blu-ray disk, etc. including the software and/or firmware. Further still, the example allocation generator 204 of FIG. 2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
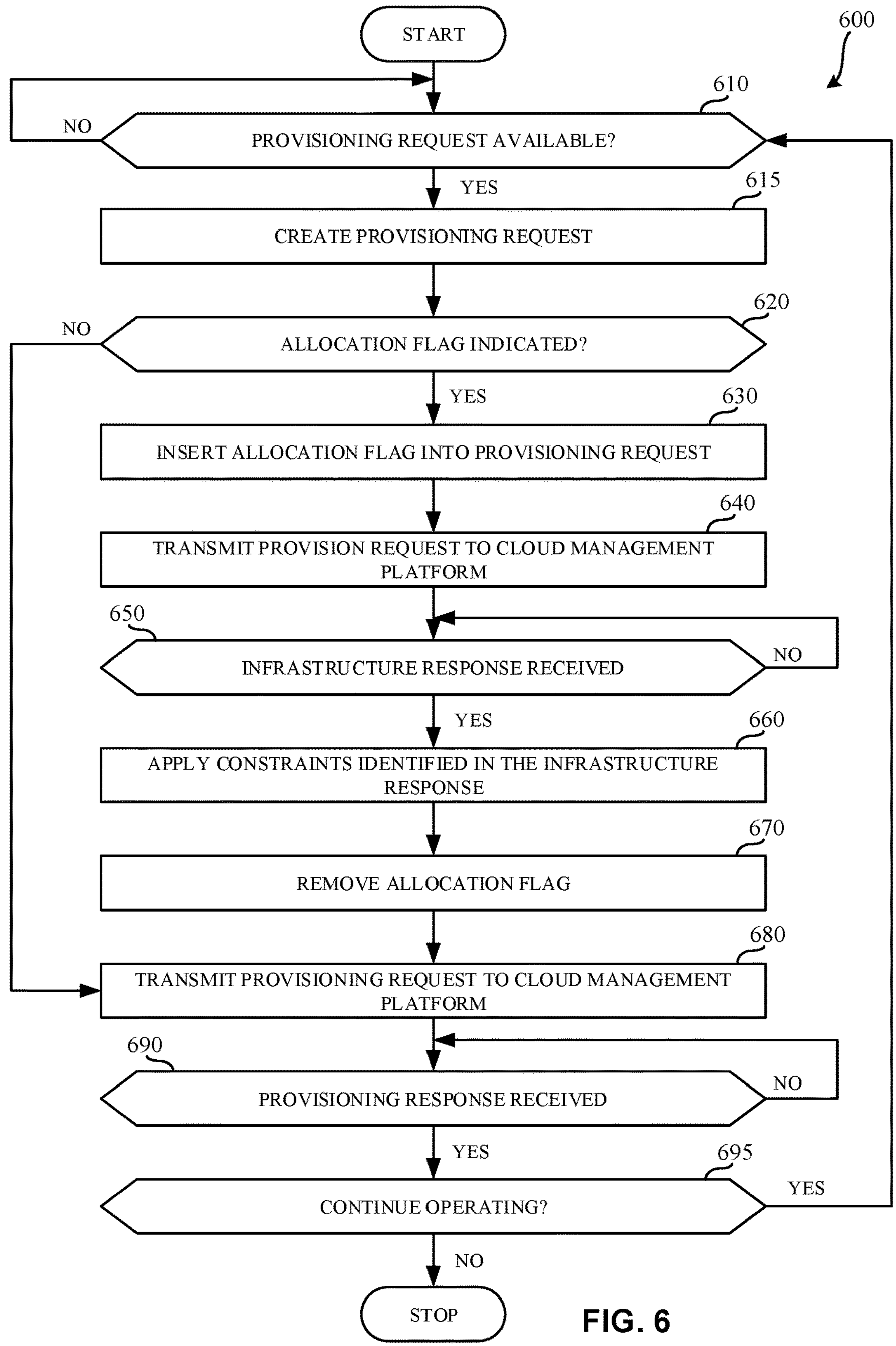
FIG. 6 is a flowchart representative of example machine readable instructions that may be executed to implement the resource allocator of FIGS. 2 and/or 3.

A flowchart representative of example hardware logic, machine readable instructions, hardware implemented state machines, and/or any combination thereof for implementing the allocation generator 204 of FIG. 3 is shown in FIG. 6. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 6, many other methods of implementing the example allocation generator 204 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 6 is a flowchart representative of example machine readable instructions 600 that may be executed to implement the resource allocator 204 of FIGS. 2 and/or 3. In the instructions 600 of FIG. 6, the interface 302 of FIG. 3 determines whether the provisioning request is available (block 610). For example, the interface 302 communicates with the user device 202 of FIG. 2 to determine if the user has provided an initial provisioning request. If the provisioning request is not available, the resource allocator 204 continues to wait.

Alternatively, if a provisioning request is available (e.g., the control of block 610 returns YES), then the request generator 304 generates and/or otherwise creates the provisioning request (e.g., the provisioning request 203) (block 615). In response, the interface 302 determines whether an allocation flag is indicated (block 620). If an allocation flag is not available, then control proceeds to block 680. Alternatively, if an allocation flag is available, then the flag applicator 306 inserts the allocation flag into the provisioning request (e.g., the allocation flag 205 and the provisioning request 203) (block 630). In response, the interface 302 transmits the provisioning request (e.g., the provisioning request 203) to the cloud management platform 206 (block 640).

The interface 302 determines whether an infrastructure response (e.g., the infrastructure response 207) has been received (block 650). If the infrastructure response (e.g., the infrastructure response 207) is not available, the resource allocator 204 continues to wait. Alternatively, if the infrastructure response (e.g., the infrastructure response 207) is available, then the request generator 304 applies the constraints identified in the infrastructure response (e.g., the infrastructure response 207) (block 660). Additionally, the flag applicator 306 removes the allocation flag (e.g., the allocation flag 205) (block 670). The interface 302 then transmits the provisioning request to the cloud management platform 206 (block 680).

In response to the control of block 680, the interface 302 determines whether the provisioning response (e.g., the provisioning response 215) has been received (block 690). If the provisioning response (e.g., the provisioning response 215) is not available, the resource allocator 204 continues to wait. Alternatively, if the provisioning response (e.g., the provisioning response 215) is available, then the allocation generator 204 determines whether to continue operating (block 695). If the allocation generator 204 determines to continue operating, then control returns to block 610. Alternatively, if the allocation generator 204 determines not to continue operating, then the process stops. For example, during a loss of power event, a shut-off signal, etc., the allocation generator 204 may determine not to continue operating.

While an example manner of implementing the cloud management platform 206 of FIG. 2 is illustrated in FIG. 4, one or more of the elements, processes and/or devices illustrated in FIG. 4 may be combined, divided, re-arranged, omitted, eliminated and/or implemented in any other way. Further, the example user interface 402, the example request interpreter 404, the example provision determiner 406, the example request applicator 408, the example cloud interface 410 and/or, more generally, the example cloud management platform 206 of FIG. 2 may be implemented by hardware, software, firmware and/or any combination of hardware, software and/or firmware. Thus, for example, any of the example user interface 402, the example request interpreter 404, the example provision determiner 406, the example request applicator 408, the example cloud interface 410 and/or, more generally, the example cloud management platform 206 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 402, the example request interpreter 404, the example provision determiner 406, the example request applicator 408, the example cloud interface 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example cloud management platform 206 of FIG. 2 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
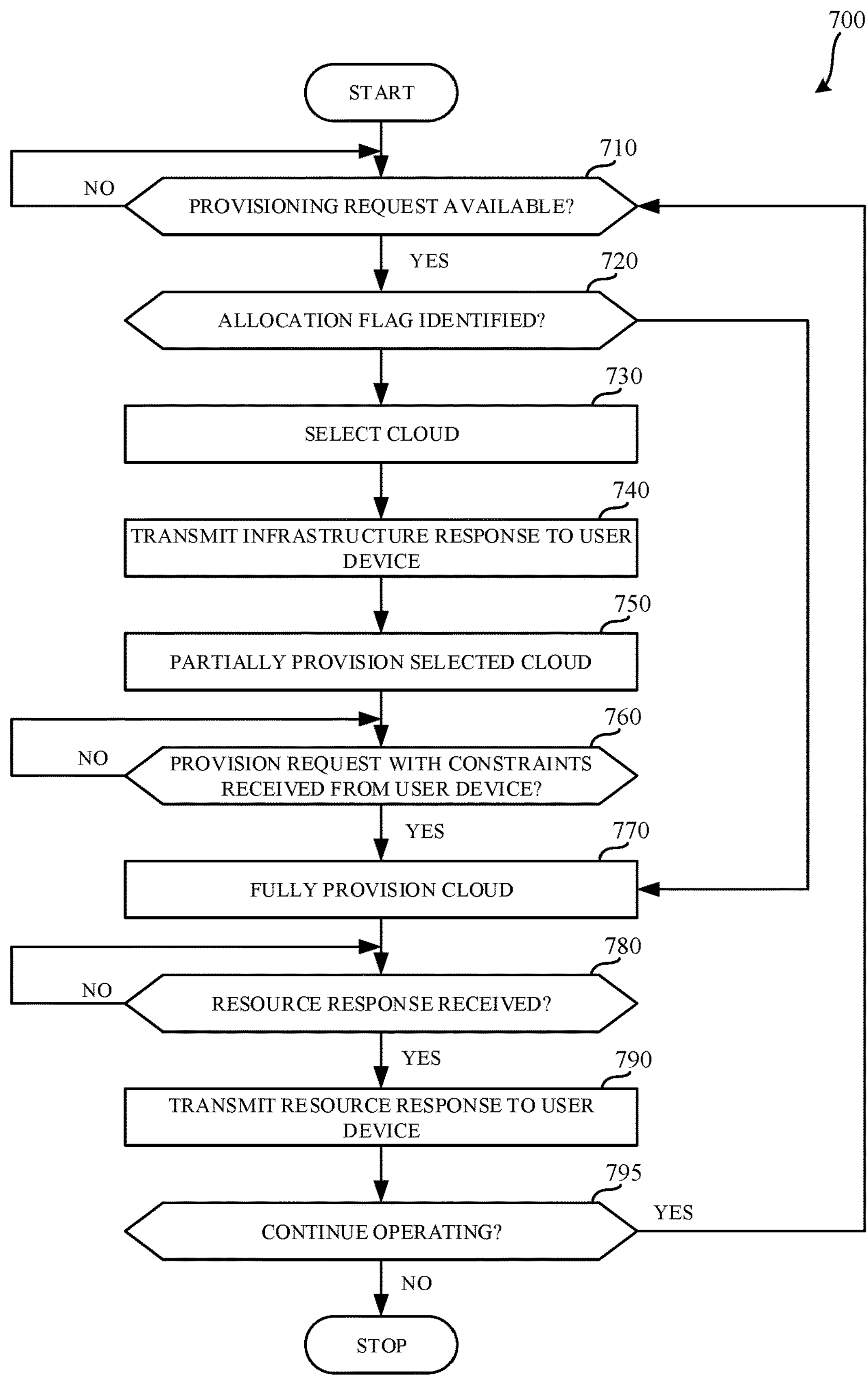
FIG. 7 is a flowchart representative of example machine readable instructions that may be executed to implement the cloud management platform of FIGS. 2 and/or 4.

A flowchart representative of example hardware logic, machine readable instructions, hardware implemented state machines, and/or any combination thereof for implementing the cloud management platform 206 of FIG. 4 is shown in FIG. 7. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 7, many other methods of implementing the example cloud management platform 206 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 7 is a flowchart representative of example machine readable instructions 700 that may be executed to implement the cloud management platform 206 of FIGS. 2 and/or 4. In FIG. 7, the user interface 402 determines whether a provisioning request (e.g., the provisioning request 203) is available (block 710). If user interface 402 determines the provisioning request (e.g., the provisioning request 203) is not available, then the cloud management platform 206 continues to wait. Alternatively, if the user interface 402 determines the provisioning request (e.g., the provisioning request 203) is available, then the request interpreter 404 determines whether the provisioning request (e.g., the provisioning request 203) includes an allocation flag (e.g., the allocation flag 205) (block 720). If the allocation flag (e.g., the allocation flag 205) is not identified by the request interpreter 404, then control proceeds to block 770. In some examples, if the allocation flag (e.g., the allocation flag 205) is not identified by the request interpreter 404, then the cloud management platform 206 and, more specifically, the request applicator 408 may determine to set an allocation flag based on the extracted content of the provisioning request (e.g., the provisioning request 203). Further in such example, if the provisioning request (e.g., the provisioning request 203) is missing critical data (e.g., cloud resource specific constraints), then the request applicator 408 may insert an allocation flag.

If an allocation flag (e.g., the allocation flag 205) is identified by the request interpreter 404, then provision determiner selects a cloud resource (or multiple cloud resources) of the cloud resources 208*a*, 208*b*, 208*c* (block 730). In response, the request applicator 408 transmits an infrastructure response (e.g., the infrastructure response 207) to the user device 202 (block 740). In response to, or concurrent with, the cloud interface 410 partially provisions (e.g., reserves and/or otherwise allocates) the selected cloud (e.g., transmits the resource request 211) (block 750).

In doing so, the user device 202 determines whether a provisioning request (e.g., the provisioning request 203) has been received from the user device 202 with constraints (block 760). If the user device 202 determines a provisioning request (e.g., the provisioning request 203) has not been received from the user device 202 with constraints, then the user device 202 continues to wait. Alternatively, if the user device 202 determines a provisioning request (e.g., the provisioning request 203) has been received from the user device 202 with constraints, then the cloud interface 410 fully provisions the cloud (block 770). Moreover, the cloud interface 410 determines whether a resource response (e.g., the resource response 213) has been received (block 780). If the cloud interface 410 determines a resource response (e.g., the resource response 213) has not been received, then the cloud interface 410 continues to wait. Alternatively, if the cloud interface 410 determines a resource response (e.g., the resource response 213) has been received, then the user interface 402 transmits the response to the user device 202 (e.g., transmits the provisioning response 215) (block 790).

The cloud management platform 206 determines whether to continue operating (block 795). If the cloud management platform 206 determines to continue operating, then control returns to block 710. Alternatively, if the cloud management platform 206 determines not to continue operating, then the process stops. For example, during a loss of power event, a shut-off signal, etc., the cloud management platform 206 may determine not to continue operating.

Figure 8:
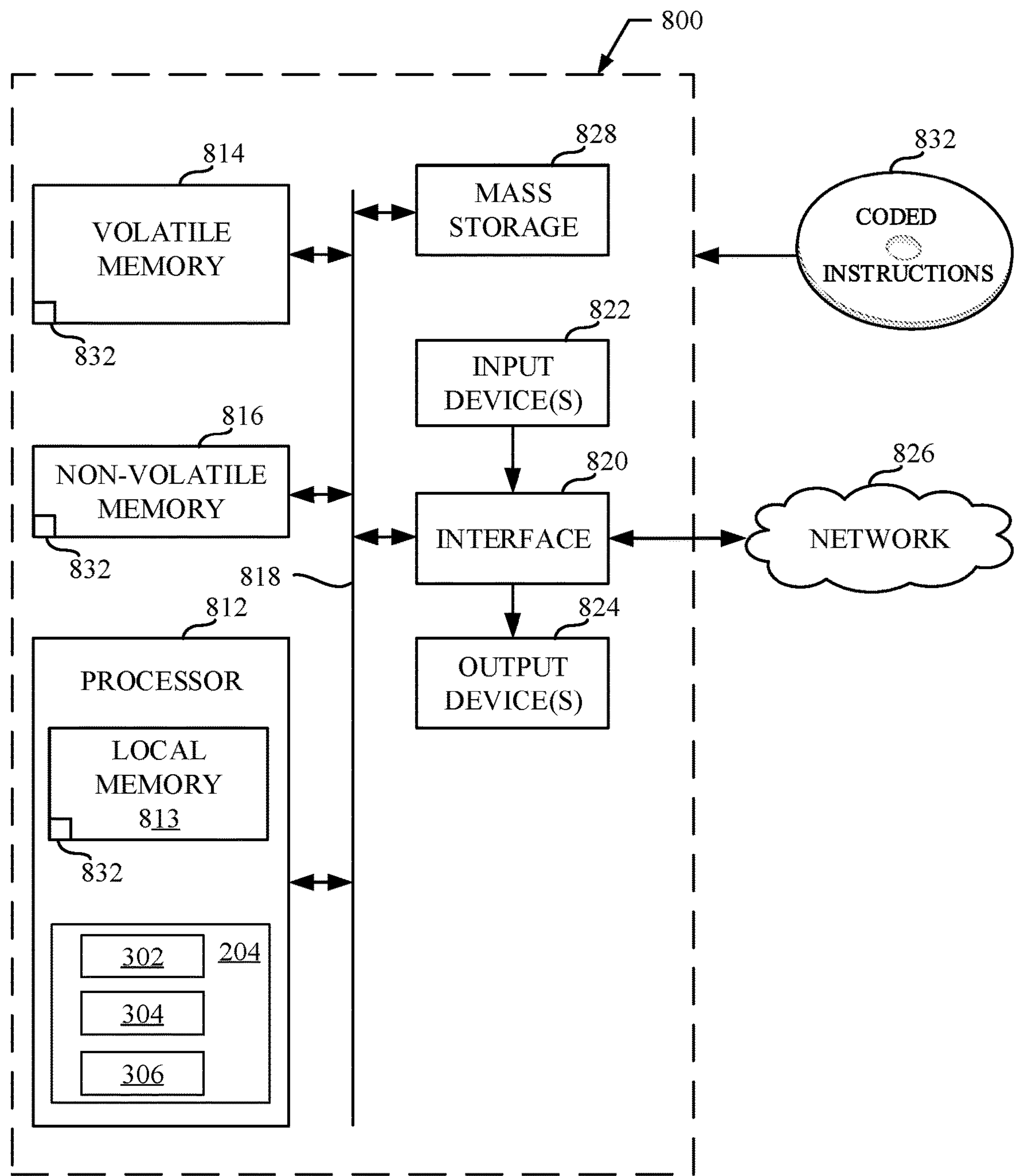
FIG. 8 is a block diagram of an example processor platform structured to execute the instructions of FIG. 6 to implement the application generator of FIG. 3.

FIG. 8 is a block diagram of an example processor platform 800 structured to execute the instructions of FIG. 6 to implement the application generator 204 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example interface 302, the example request generator 304, and the example flag applicator 306.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device (s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 6 may be stored in the mass storage device 828, in the volatile memory 814, in the non-volatile memory 816, and/or on a removable non-transitory computer readable storage medium such as a CD or DVD.

Figure 9:
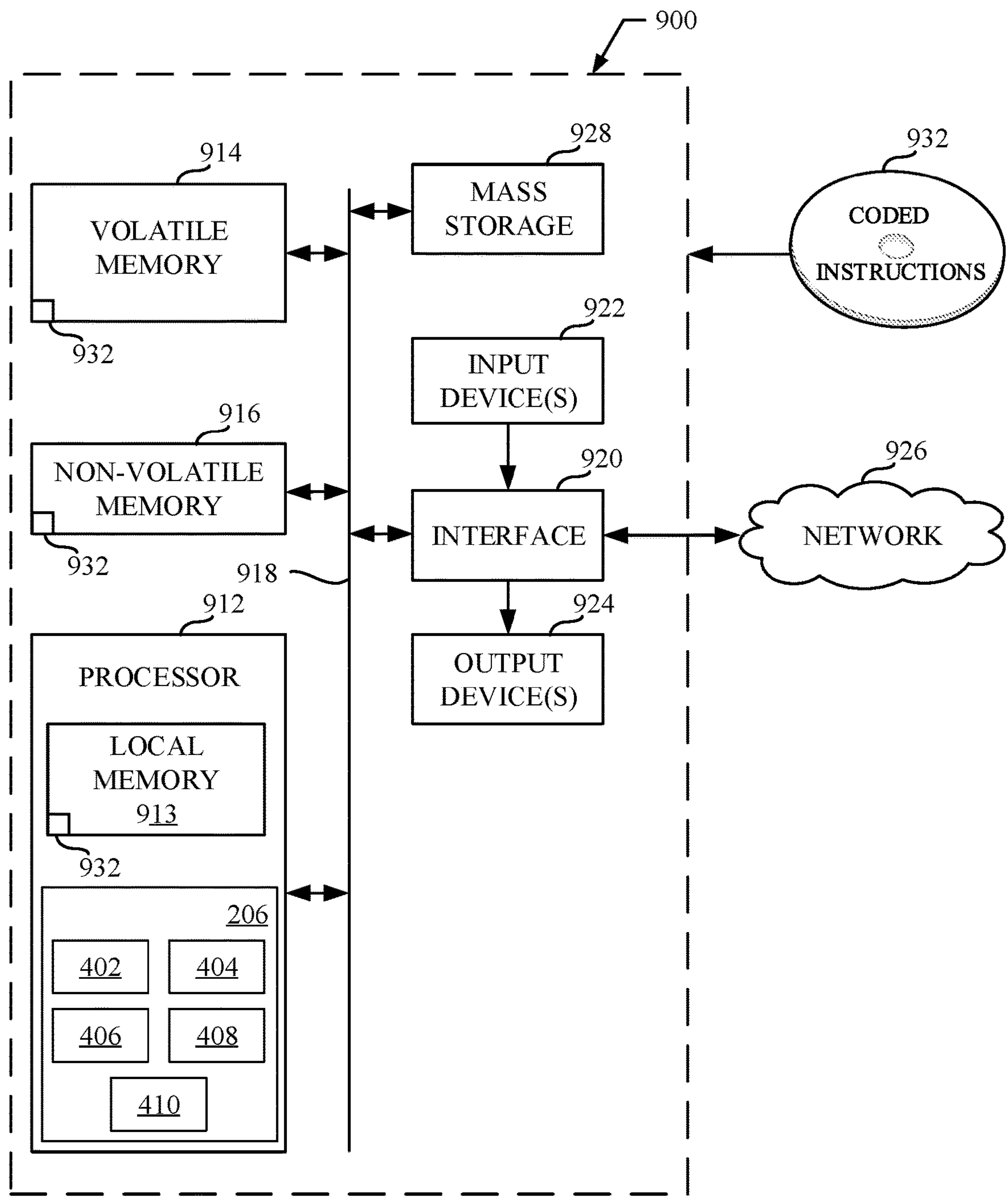
FIG. 9 is a block diagram of an example processor platform structured to execute the instructions of FIG. 7 to implement the cloud management platform of FIG. 4.

FIG. 9 is a block diagram of an example processor platform 900 structured to execute the instructions of FIG. 7 to implement the cloud management platform 206 of FIG. 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user interface 402, the example request interpreter 404, the example provision determiner 406, the example request applicator 408, and the example cloud interface 410.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device (s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that allow a user to provision a cloud resource and/or virtual machine without knowing which cloud resource and/or virtual machine is to be provisioned. For example, in a cloud agnostic system, the user does not know, nor do they prefer, a specific cloud resource (e.g., Amazon AWS cloud, Microsoft Azure, etc.). As such, the disclosed method, apparatus and articles of manufacture partially provision the selected cloud resource in a cloud agnostic system to reduce the amount of failed cloud resource provisions. The disclosed methods, apparatus and articles of manufacture improve the efficiency of using a computing device by allowing a user to flag a provisioning request as allocation only, thereby enabling a cloud agnostic system to operate with a reduced failure rate. By flagging a provisioning request as allocation only, the methods, apparatus and articles of manufacture disclosed herein can determine and reserve a selected cloud resource before fully provisioning the selected cloud resource. This reduces the provisioning failures in a cloud agnostic system when because the cloud specific constraints can be included at a later time. Once the selected cloud resource is determined, a user can indicate the specific constraints to fully provision the selected cloud resource. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to implement cloud specific functionality in a cloud agnostic system, the apparatus comprising:

a request interpreter to determine whether a first provisioning request includes an indication that a cloud resource is to be partially provisioned;

a request applicator to:

determine whether the first provisioning request includes a satisfactory blueprint based on content of the first provisioning request; and in response to the first provisioning request not including a satisfactory blueprint, to include the indication in a first resource request;

a provision determiner to select the cloud resource based on the indication; and a cloud interface to:

transmit the first resource request to partially provision the cloud resource;

when the cloud resource is partially provisioned, transmit a response to obtain a second provisioning request including constraints specific to the cloud resource; and in response to obtaining the second provisioning request, transmit a second resource request to fully provision the cloud resource.

2. The apparatus of claim 1, further including a request applicator to create the first resource request and communicate with the cloud interface to transmit the response to a user device, the response identifying the selected cloud resource.

3. The apparatus of claim 2, wherein the request applicator is to transmit the response concurrently with the cloud interface transmitting the first resource request.

4. The apparatus of claim 1, wherein the satisfactory blueprint includes content to fully provision the selected cloud resource.

5. The apparatus of claim 1, wherein the cloud interface is further to transmit a provisioning response to a user device after the selected cloud resource is fully provisioned.

6. The apparatus of claim 1, wherein the provision determiner is to select the cloud resource based on content of the first request and a set of rules.

7. A non-transitory computer readable storage medium comprising instructions which, when executed, cause at least one processor to at least:

determine whether a first provisioning request includes an indication that a cloud resource is to be partially provisioned;

determine whether the first provisioning request includes a satisfactory blueprint based on content of the first provisioning request;

in response to the first provisioning request not including a satisfactory blueprint, include the indication in a first resource request;

select the cloud resource based on the indication;

transmit the first resource request to partially provision the cloud resource;

when the cloud resource is partially provisioned, transmit a response to obtain a second request including constraints specific to the cloud resource; and in response to obtaining the second request, transmit a second resource request to fully provision the cloud resource.

8. The non-transitory computer readable storage medium of claim 7, wherein the instructions, when executed, cause the at least one processor to:

create the first resource request; and communicate with a cloud interface to transmit the response to a user device, the response identifying the selected cloud resource.

9. The non-transitory computer readable storage medium of claim 8, wherein the instructions, when executed, cause the at least one processor to transmit the response concurrently with the first resource request.

10. The non-transitory computer readable storage medium of claim 7, wherein the satisfactory blueprint includes content to fully provision the selected cloud resource.

11. The non-transitory computer readable storage medium of claim 7, wherein the instructions, when executed, cause the at least one processor to transmit a provisioning response to a user device after the selected cloud resource is fully provisioned.

12. The non-transitory computer readable storage medium of claim 7, wherein the instructions, when executed, cause the at least one processor to select the cloud resource based on content of the first request and a set of rules.

13. A method to implement cloud specific functionality in a cloud agnostic system, the method comprising:

determining whether a first provisioning request includes an indication that a cloud resource is to be partially provisioned;

determining whether the first provisioning request includes a satisfactory blueprint based on content of the first provisioning request; and in response to the first provisioning request not including a satisfactory blueprint, including the indication in a first resource request;

selecting the cloud resource based on the indication;

transmitting the first resource request to partially provision the cloud resource;

when the cloud resource is partially provisioned, transmitting a response to obtain a second provisioning request including constraints specific to the cloud resource; and in response to obtaining the second provisioning request, transmitting a second resource request to fully provision the cloud resource.

14. The method of claim 13, further including creating the first resource request and communicating with a cloud interface to transmit the response to a user device, the response identifying the selected cloud resource.

15. The method of claim 14, further including transmitting the response concurrently with the first resource request.

16. The method of claim 13, further including transmitting a provisioning response to a user device after the selected cloud resource is fully provisioned.

17. The method of claim 13, further including selecting the cloud resource based on content of the first request and a set of rules.

* * * * *